US009063256B2

(12) United States Patent
Liao

(10) Patent No.: US 9,063,256 B2
(45) Date of Patent: Jun. 23, 2015

(54) DISPLAY MODULE HAVING SUPPORT STRUCTURE FOR DISPLAY PANEL

(71) Applicant: AU Optronics Corporation, Hsin-Chu (TW)

(72) Inventor: Chien-Ting Liao, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 13/955,015

(22) Filed: Jul. 31, 2013

(65) Prior Publication Data

US 2014/0071713 A1 Mar. 13, 2014

(30) Foreign Application Priority Data

Sep. 13, 2012 (TW) .............................. 101133516 A

(51) Int. Cl.
| F21V 8/00 | (2006.01) |
| F21V 21/00 | (2006.01) |
| G02F 1/1335 | (2006.01) |
| G02F 1/1333 | (2006.01) |

(52) U.S. Cl.
CPC .............. *G02B 6/0011* (2013.01); *F21V 21/00* (2013.01); *G02B 6/0088* (2013.01); *G02F 1/1335* (2013.01); *G02F 1/133308* (2013.01); *G02F 2001/133317* (2013.01)

(58) Field of Classification Search
USPC .......................................... 362/632, 633, 634
See application file for complete search history.

(56) References Cited

U.S. PATENT DOCUMENTS

| 2003/0048629 | A1* | 3/2003 | Kim et al. ........................ 362/27 |
| 2006/0044838 | A1* | 3/2006 | Nitto .............................. 362/632 |
| 2007/0086212 | A1* | 4/2007 | Fang .............................. 362/633 |
| 2008/0252811 | A1 | 10/2008 | Shang |
| 2009/0296016 | A1 | 12/2009 | Chang et al. |
| 2011/0085107 | A1* | 4/2011 | Noh et al. ........................ 349/61 |
| 2011/0279748 | A1 | 11/2011 | Hasegawa |

FOREIGN PATENT DOCUMENTS

| CN | 101285953 A | 10/2008 |
| CN | 201437529 | 4/2010 |

(Continued)

OTHER PUBLICATIONS

English translation of abstract of CN 201437529 (published Apr. 14, 2010).

(Continued)

*Primary Examiner* — Laura Tso
(74) *Attorney, Agent, or Firm* — McClure, Qualey & Rodack, LLP

(57) ABSTRACT

A display module includes a display panel and a backlight module. The display panel has overlapped first and second substrates, wherein the first substrate extends beyond the second substrate at a first side. The backlight module is disposed on one side of the display module opposite to the display surface and includes a support unit disposed along the first side. The support unit has a first tier portion and a second tier portion, which is lifted toward the display panel with respect to the first tier portion and supports the display panel. A projection region of the display panel supported by the second tier portion on the first substrate covers or overlaps the edge of the second substrate at the first side and extends to an overlapping area of the first substrate and the second substrate.

13 Claims, 9 Drawing Sheets

(56) References Cited

FOREIGN PATENT DOCUMENTS

| | | |
|---|---|---|
| CN | 101943351 A | 1/2011 |
| CN | 102042539 A | 5/2011 |
| TW | 200949359 A | 12/2009 |

OTHER PUBLICATIONS

English translation of abstract of CN 101943351 A (published Jan. 12, 2011).

China Office Action dated Sep. 26, 2014.

* cited by examiner

DISPLAY MODULE HAVING SUPPORT STRUCTURE FOR DISPLAY PANEL

BACKGROUND OF THE INVENTION

1. Field of the Invention

The present invention generally relates to a display module. Particularly, the present invention relates to a display module having a special support structure.

2. Description of the Prior Art

In recent years, flat display modules have been widely applied to various fields as independent monitor, such as television, or embedded into electronic devices as information display device. There are various types of flat display modules; among them, liquid crystal display panel is the most common flat display module.

As shown in FIG. 1, the conventional liquid crystal display module mainly includes a display panel 10 and a backlight module 30. The display panel 10 generally includes a lower substrate 11 and an upper substrate 12, wherein the upper substrate 12 covers the lower substrate 11 while the lower substrate 11 extends beyond the upper substrate 12. Driving circuit 13 and layout circuits are generally disposed on the lower substrate 11 that extends beyond the upper substrate 12 and is provided for connection to the external signal circuit 15. The backlight module 30 includes a bracket 31, a light guide plate 33, and a light bar 35, wherein the bracket 31 is bent to form a top platform 50; the light bar 35 and one end of the light guide plate 33 are located under the top platform 50. During assembly, the display panel 10 is disposed on the backlight module 30 with the extending portion of the lower substrate 11 disposed and supported on the top platform 50. A double sided tap 70 is generally disposed between the bottom of the lower substrate 11 and the top platform 50 to fix the relative position thereof.

In such a design, the overlapping portion of the lower substrate 11 and the upper substrate 12 is a dual-layer glass, which has stronger strength; however, the extending portion of the lower substrate 11 is a single layer glass, which is weaker in strength. When the display module is subjected to external impact, the extending portion of the lower substrate 11 that is not supported by the top platform 50 is susceptible to damage, impairing the production yield of products.

SUMMARY OF THE INVENTION

It is an object of the present invention to provide a display module capable of reducing the damage possibility of display panel.

It is another object of the present invention to provide a display module having a better support structure for display panel contained therein.

The display module of the present invention includes a display panel and a backlight module. The display panel has a first substrate and a second substrate, wherein the second substrate and the first substrate overlap with each other. The first substrate extends beyond an edge of the second substrate at a first side. The backlight module is disposed under the display panel, i.e. on one side of the display panel opposite to a display surface. The backlight module has a support unit disposed along the first side to support a portion of a bottom surface of the display panel along the first side.

The support unit has a first tier portion and a second tier portion. The first tier portion and the second tier portion respectively extend along the first side in a longer side direction. One side of the second tier portion is connected to the first tier portion. The second tier portion is lifted toward the display panel with respect to the first tier portion and supports the bottom surface of the display panel. A projection region of a portion of the display panel, which is substantially supported by the second tier portion, on the first substrate covers or overlaps an edge of the second substrate at the first side and extends to an overlapping area of the first substrate and the second substrate. With such a design, the breakage or damage possibility at the boundary between the first substrate and the second substrate and at the first substrate not covered by the second substrate can be reduced.

DETAILED DESCRIPTION OF THE PREFERRED EMBODIMENT

The present invention provides a display module. In a preferred embodiment, the display module of the present invention is a liquid crystal display module and also can be other types of products.

Figure 1:
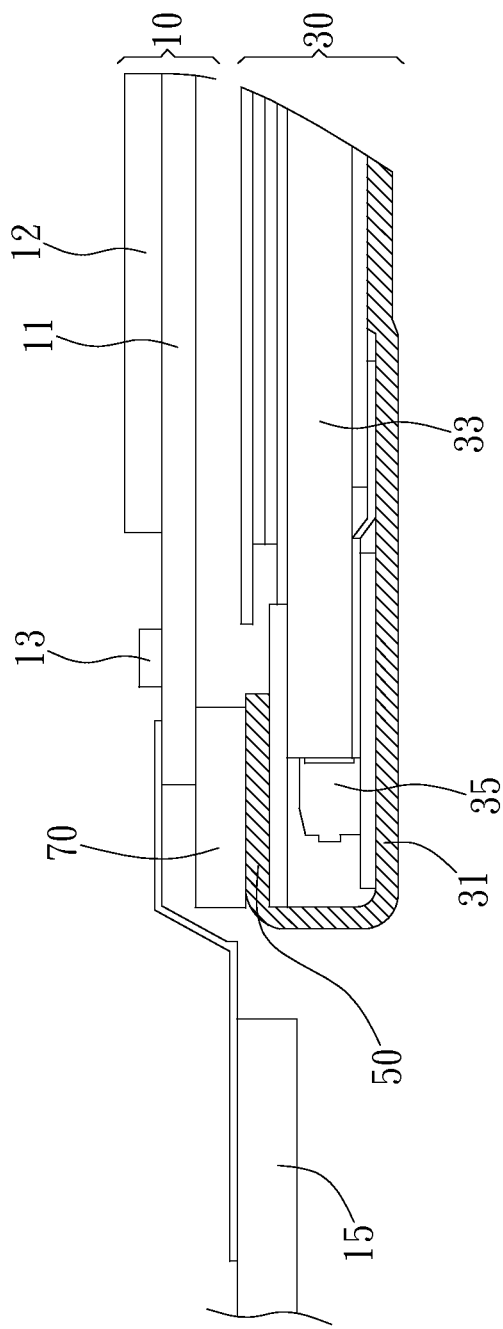
FIG. 1 is a cross-sectional view of the conventional display module.
Figure 2:
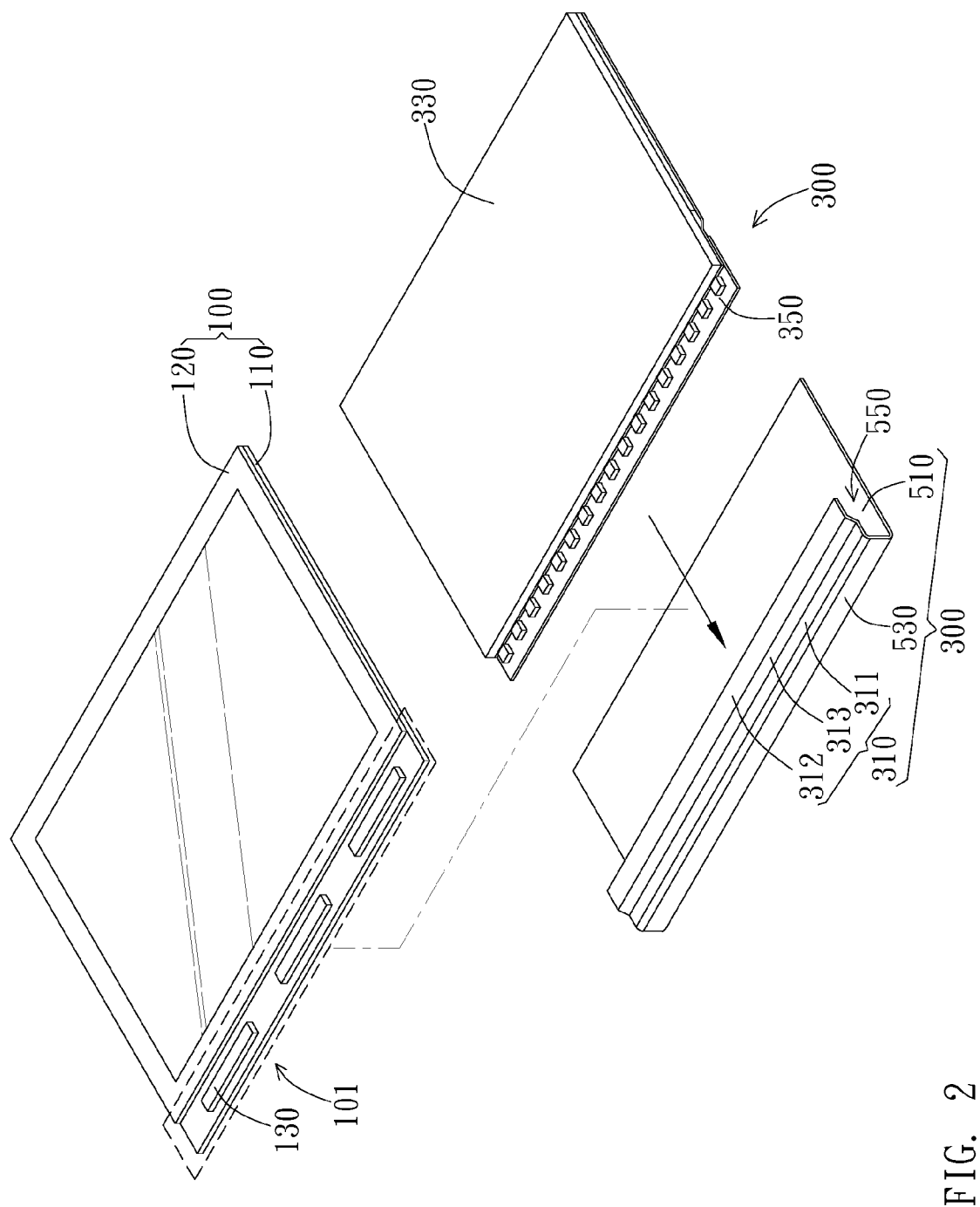
FIG. 2 is an exploded view of the embodiment of the display module of the present invention.
Figure 3:
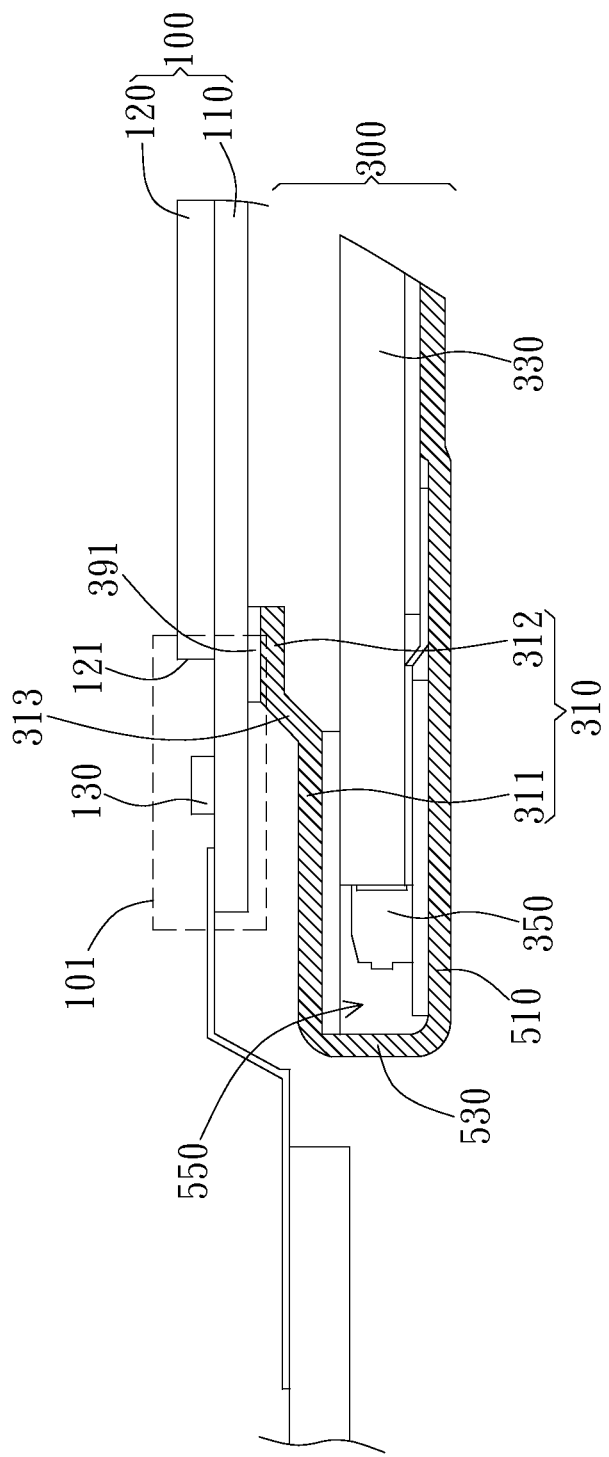
FIG. 3 is a cross-sectional view of the embodiment of the display module of the present invention.

As shown in FIG. 2 and FIG. 3, the display module includes a display panel 100 and a backlight module 300. The display panel 100 is preferably a liquid crystal display panel and has a first substrate 110 and a second substrate 120, wherein a liquid crystal layer (not shown) is sealed between the first substrate 110 and the second substrate 120. The first substrate 110 and the second substrate 120 are preferably made of glass, but not limited thereto. For example, the first substrate 110 and the second substrate 120 can be made of plastic materials. In the embodiment, the first substrate 110 is the lower substrate of the display panel 100 and located on one side of the display panel 100 that is closer to the backlight module 300. The second substrate 120 is the upper substrate of the display panel 100 and located on one side of the display panel 100 that displays images. The first substrate 110 and the second substrate 120 overlap with each other, wherein the first substrate 110 extends beyond an edge of the second substrate 120 at a first side 101. The liquid crystal layer is preferably sealed between the first substrate 110 and the second substrate 120. The rotation of liquid crystal molecules is controlled by the transistor circuit on the first substrate 110 or the second substrate 120. In addition, electronic components, such as the driving circuit 130, are preferably disposed on the extending portion of the first substrate 110 that is exposed outside the second substrate 120.

As shown in FIG. 2 and FIG. 3, the backlight module 300 is disposed under the display panel 100, i.e. is located on one side of the display panel 100 that is opposite to the display surface. In the embodiment, the backlight module 300 is disposed on one side of the first substrate 110 opposite to the second substrate 120. The backlight module 300 includes a support unit 310 that is disposed along the first side 101, so as to support a portion of the bottom surface of the display panel 100 along the first side 101. In the preferred embodiment, the backlight module 300 has an edge type lighting design and includes a light guide plate 330 that is parallel to the bottom surface of the display panel 100, i.e. the bottom surface of the first substrate 110 in the embodiment. However, in other embodiments, the backlight module 300 can have a direct type lighting design, which also includes the support unit 310.

As shown in FIG. 3, the support unit 310 has a first tier portion 311 and a second tier portion 312. The first tier portion 311 and the second tier portion 312 preferably extend along the first side 101 in a longer side direction and parallel to the display panel 100. One side of the second tier portion 312 is connected to the first tier portion 311. The second tier portion 312 is lifted toward the display panel 100 with respect to the first tier portion 311 and supports the bottom surface of the display panel 100. In the embodiment, the bottom surface of the display panel 100 is the surface of the first substrate 110 that is exposed to the backlight module 300. In the embodiment, a connection piece 391 is connected between the second tier portion 312 and the display panel 100. The connection piece 391 is preferably a double-sided tape to connect the second tier portion 312 and the display panel 100. The connection piece 391 can be made of rubbers or polymers that have shock absorption ability to absorb the impact and reduce the damage possibility. However, in different embodiments, the connection piece 391 can be omitted and other types of connection or position mechanisms can be employed.

Figure 4:
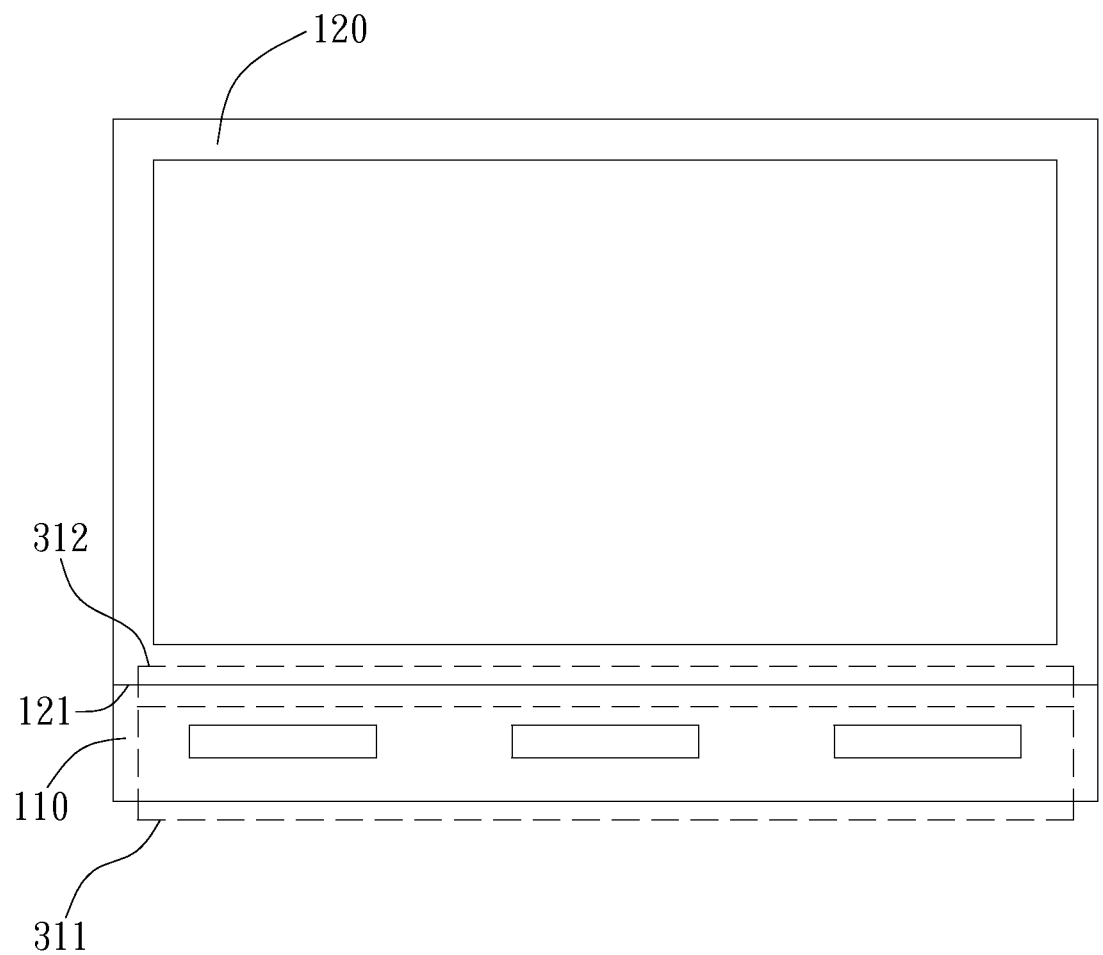
FIG. 4 is a top view of the embodiment of the display module of the present invention.

As shown in FIG. 3 and FIG. 4, the portion of the display panel 100 substantially supported by the second tier portion 312, i.e. the portion of the first substrate 110 actually contacting the second tier portion 312, has a projection region on the first substrate 110 covering or overlapping the edge 121 of the second substrate 120 at the first side 101 and extending to the overlapping area of the first substrate 110 and the second substrate 120. Since the first substrate 110 extends beyond the edge 121 of the second substrate 120 at the first side 101, when viewing the projection region of the second substrate 120 on the first substrate 110, the edge 121 of the second substrate 120 at the first side 101 will form a projection line on the first substrate 110, and the portion of the second tier portion 312 that contacts the first substrate 110 will overlap this projection line. In the embodiment, the portion of the second tier portion 312 that contacts the first substrate 110 traverses across two sides of the projection line and supports the overlapping area and the non-overlapping area of the first substrate 110 and the second substrate 120 that are adjacent to the projection line. With such a design, the breakage or damage possibility at the boundary between the first substrate 110 and the second substrate 120 as well as at the first substrate 110 that is not covered by the second substrate 120 can be reduced.

In the embodiment shown in FIG. 2 and FIG. 3, the support unit 310 is preferably a metal frame formed on the entire backlight module 300 and includes a base plate 510 disposed on the bottom of the backlight module 300. The edge of the base plate 510 that is parallel to the first side 101 is bent toward the display panel 100 to form a side wall 530, which extends toward the display panel 100. The top end of the side wall 530 is again bent over the base plate 510 to form the first tier portion 311. The first tier portion 311 is preferably parallel to the base plate 510 and an accommodation space 550 is formed between the first tier portion 311 and the base plate 510. One end of the light guide plate 330 extends into the accommodation space 550 and clamped by the first tier portion 311 and the base plate 510 from top and bottom. In the embodiment, the backlight module 300 includes a light source module 350, which is preferably a light bar consisting of light emitting diodes. The light source module 350 is also accommodated in the accommodation space 550 and protected by the first tier portion 311 and the base plate 510. The light source module 350 emits light corresponding to the end of the light guide plate 330 that is clamped.

In addition, one side of the first tier portion 311 that is opposite to the side wall 530 is bent a certain length toward the display panel 100 to form a connection portion 313. Another side of the connection portion 313 is bent back to the original direction to form a second tier portion 312. Therefore, a step height exists between the second tier portion 312 and the first tier portion 311. With such a design, the light guide plate 330 will maintain a gap with the display panel 100 while the light guide plate 330 is clamped and the display panel 1000 is supported.

From another point of view, the second tier portion 312 is formed as a free end of the support unit 310 and is closer to the center of the display panel 100 than the first tier portion 311. When the display panel 100 supported by the second tier portion 312 is subjected to external force, the suspension arm structure formed by the second tier portion 312 can provide shock absorption effect to reduce the damage possibility.

Figure 5:
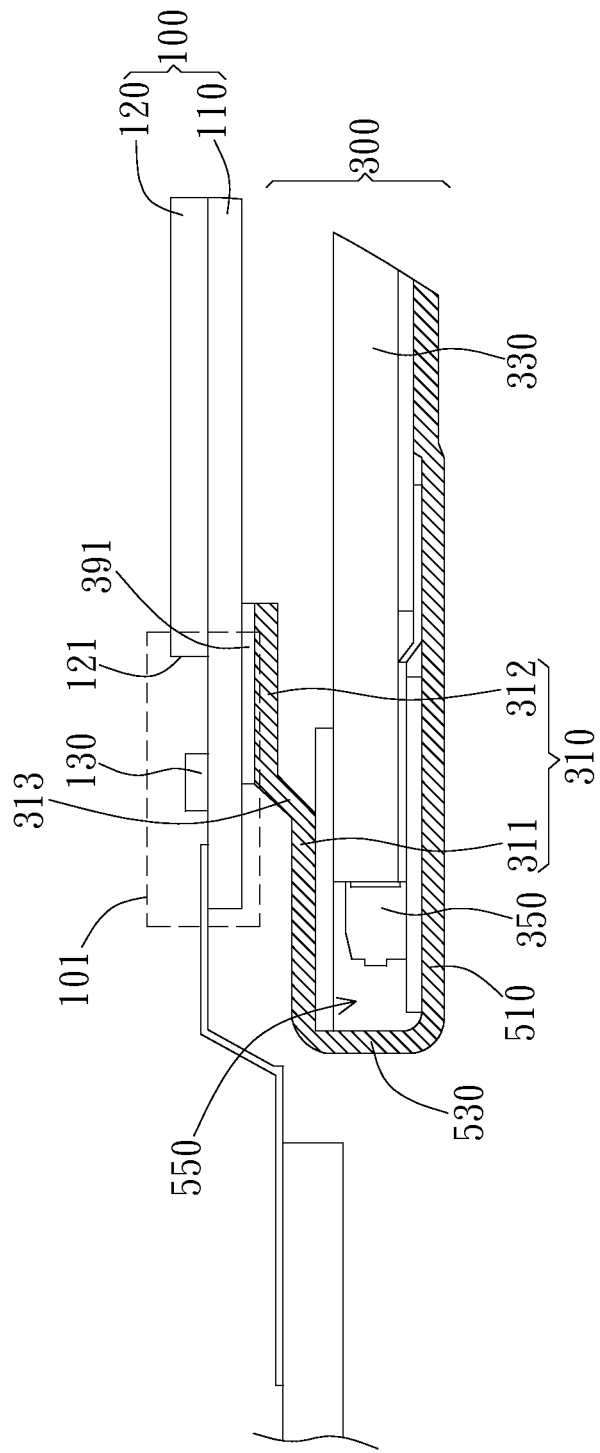
FIG. 5 is a cross-sectional view of another embodiment of the display module of the present invention.

As described above, one side of the first substrate 110 that faces the second substrate 120 is preferably disposed with the driving circuit 130 on the exposed portion not covered by the second substrate 120. In the embodiment of FIG. 5, a projection region of a portion of the display panel 100, which is supported by the second tier portion 312, on the first substrate 110 covers the first substrate 110 and the edge 121 of the second substrate 120 at the first side 101. Since the overlapping portion of the first substrate 110 and the second substrate 120 has stronger structure strength, an area of the first substrate 110 outside the projection region of the edge 121 of the second substrate 120 relatively has weaker structure strength. With such a design, the support of this area can be enhanced to reduce the damage possibility. In different embodiments, the location where the driving circuit 130 is disposed can have other electronic components or merely electrical contacts deposed thereon to achieve external electrical connection.

Figure 6:
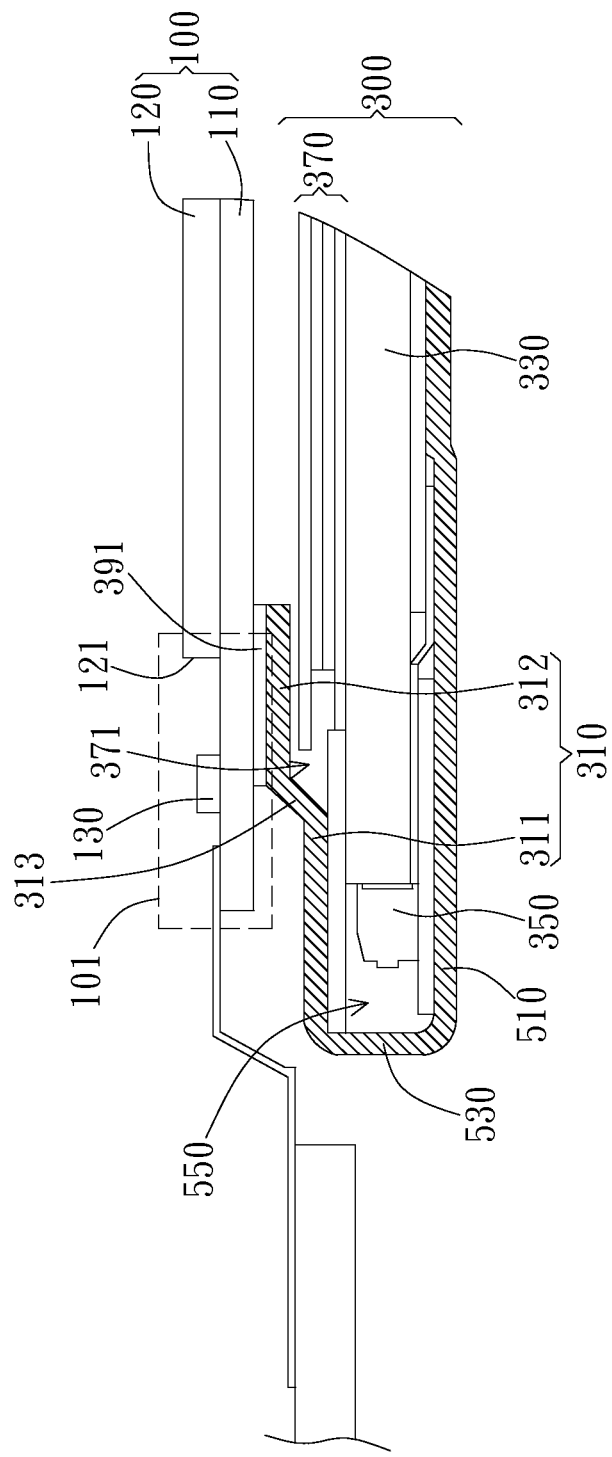
FIG. 6 is a cross-sectional view of the embodiment of the display module having optical films of the present invention.

In the embodiment of FIG. 6, the backlight module 300 further includes at least one optical film 370 disposed on the light guide plate 330. As described above, the second tier portion 312 is lifted from the first tier portion 311 so that a gap 371 is formed between the light guide plate 330 and the second tier portion 312. One end of the optical film 370 extends into the gap 371, so that the second tier portion 312 can restrict displacement of the end portion of the optical film 370 to increase the structure stability of the entire assembly. In addition, with such a design, light leakage occurred between the optical film 370 and the support unit 310 can be prevented to promote the optical performance.

Figure 7:
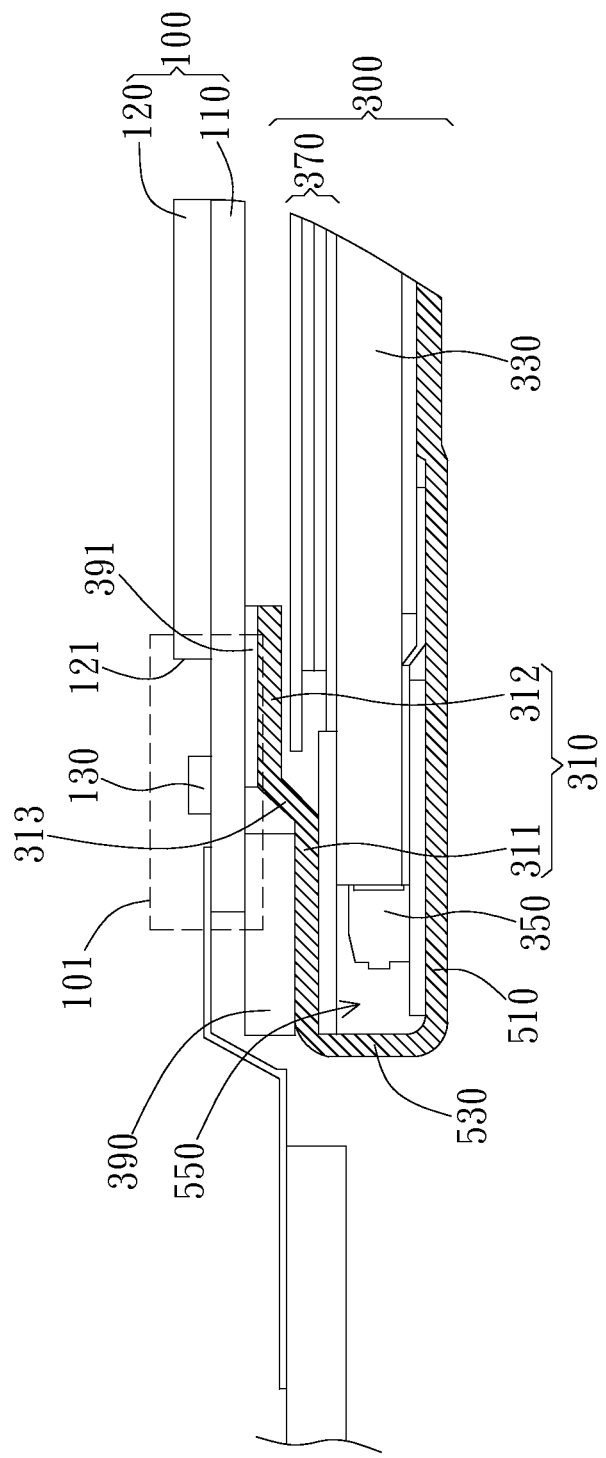
FIG. 7 is a cross-sectional view of the embodiment of the display module having the pad block of the present invention.

As shown in FIG. 7, the backlight module 300 further includes a pad block 390 disposed on one side of the first tier portion 311 that faces the display panel 100. The height of the pad block 390 is preferably not lower than the height of the top face of the second tier portion 312. The pad block 390 together with the second tier portion 312 supports the display panel 100. As shown in FIG. 7, when assembling the display panel 100, the pad block 390 and the second tier portion 312 together support the display panel 100 on the same side, i.e. on one side of the first substrate 110 in this embodiment. In addition, the pad block 390 is preferably made of rubbers, polymer materials, or other compressible or shock-absorbing materials to absorb impact on the display panel 100, but not limited thereto. Preferably, the pad block 390 is connected to the first tier portion 311 and the display panel 100 by a double-sided tape, but other types of connection mechanisms are also possible.

Figure 8:
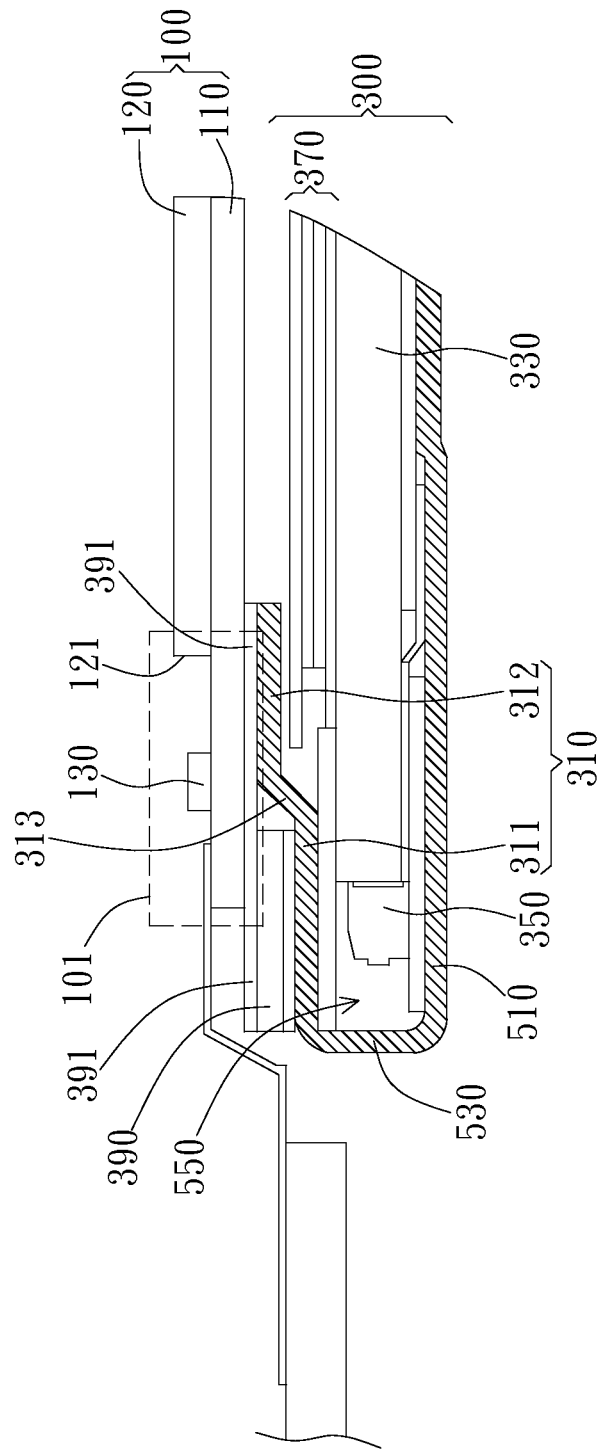
FIG. 8 is a cross-sectional view of the embodiment of the display module having the connection piece of the present invention.

In the embodiment of FIG. 8, in addition to the pad block 390, the backlight module 300 further includes a connection piece 391. The connection piece 391 extends between the pad block 390 and the display panel 100 to a location between the second tier portion 312 and the display panel 100. One side of the connection piece 391 is attached to the surface of the display panel 100; another side of the connection piece 391 is attached to surfaces of the pad block 390 and the second tier portion 312. With such a design, the connection piece 391 can enhance the strength of the display panel 100 because of its adhesion onto the display panel 100 and can further enhance the entire structure strength due to the connection relation between the pad block 390 and the second tier portion 312. The connection piece 391 is preferably a double sided tape; however, in other embodiments, the connection piece 391 can be made of rubbers or polymer materials, which have shock-absorbing ability to provide shock-absorbing effect and reduce the damage possibility, but not limited thereto.

Figure 9:
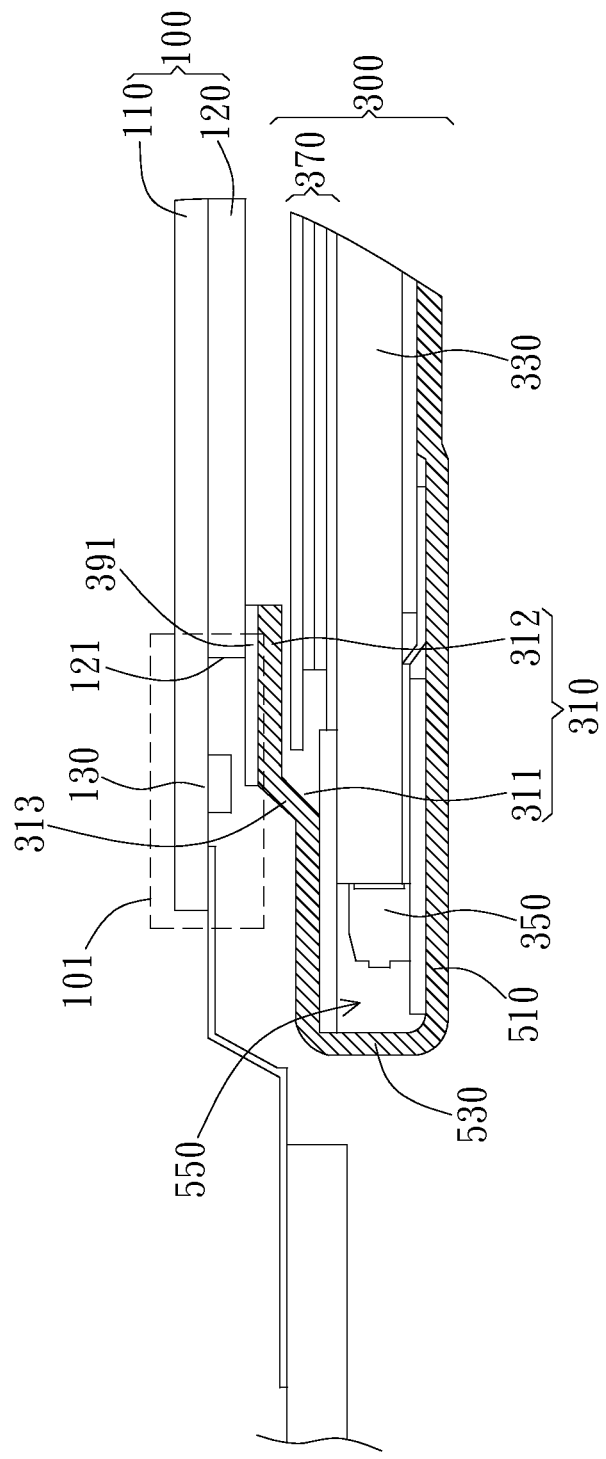
FIG. 9 is a cross-sectional view of another embodiment of the display module of the present invention.

FIG. 9 shows another embodiment of the display module. In comparison with the previous embodiments, the display panel 100 of this embodiment is designed to have a longer upper substrate and a shorter lower substrate. That is, the second substrate 120 is closer to the backlight module 300, and the first substrate 110 overlaps the second substrate 120 opposite to the backlight module 300 and has a display surface. In this embodiment, the second tier portion 312 supports the bottom surface of the second substrate 120 and a projection region of the supported portion on the first substrate 110 also covers the edge 121 of the second substrate 120 at the first side 101 and extends to the overlapping area of the first substrate 110 and the second substrate 120.

Although the preferred embodiments of present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A display module, comprising:
a display panel, including:
a first substrate; and
a second substrate overlapping the first substrate, wherein the first substrate extends beyond the second substrate at a first side; and
a backlight module disposed under the display panel, the backlight module including a light guide plate and having a support unit disposed along the first side, an end portion of the light guide plate parallel to the first side being clamped by the support unit;
wherein the support unit has a first tier portion and a second tier portion, the second tier portion is lifted from the first tier portion toward the display panel and supports the display panel, a projection region of a portion of the display panel substantially supported by the second tier portion on the first substrate covers an edge of the second substrate at the first side and extends to an overlapping area of the first substrate and the second substrate;

wherein the backlight module includes a connection piece disposed between the second tier portion and the display panel.

2. The display module of claim 1, wherein the second tier portion is formed as a free end of the support unit and is closer to a center of the display panel than the first tier portion.

3. The display module of claim 1, wherein the support unit includes a base plate disposed on one side of the first tier portion opposite to the light guide plate; an accommodation space is formed between the base plate and the first tier portion; the base plate and the first tier portion together clamp the end portion of the light guide plate.

4. The display module of claim 3, wherein the backlight module includes at least one optical film disposed on the light guide plate; a gap exists between the second tier portion and the light guide plate; an end of the optical film extends into the gap.

5. The display module of claim 1, wherein the second tier portion supports the display panel by supporting the first substrate.

6. The display module of claim 1, wherein the second tier portion supports the display panel by supporting the second substrate.

7. The display module of claim 1, wherein the display panel includes a driving circuit disposed on one side of the first substrate facing the second substrate and located on a portion exposed by the second substrate; the projection region of the portion of the display panel supported by the second tier portion on the first substrate covers an area of the first substrate between the driving circuit and the edge of the second substrate at the first side.

8. The display module of claim 1, wherein one side of the first tier portion facing the display panel is bent to form a connection portion; another side of the connection portion is bent to form the second tier portion.

9. A display module, comprising:
a display panel, including:
a first substrate; and
a second substrate overlapping the first substrate, wherein the first substrate extends beyond the second substrate at a first side; and
a backlight module disposed under the display panel, the backlight module having a support unit disposed along the first side;
wherein the support unit has a first tier portion and a second tier portion, the second tier portion is lifted from the first tier portion toward the display panel and supports the display panel, a projection region of a portion of the display panel substantially supported by the second tier portion on the first substrate covers an edge of the second substrate at the first side and extends to an overlapping area of the first substrate and the second substrate;
wherein the backlight module includes a pad block disposed on the first tier portion facing the display panel; the pad block and the second tier portion together support the display panel on a same side.

10. The display module of claim 9, wherein the backlight module includes a connection piece extending between the pad block and the display panel to a location between the second tier portion and the display panel; one side of the connection piece is attached to the display panel; another side of the connection piece is attached to the pad block and the second tier portion.

11. The display module of claim 9, wherein the second tier portion supports the display panel by supporting the first substrate.

12. The display module of claim 10, wherein the second tier portion supports the display panel by supporting the first substrate.

13. The display module of claim 9, wherein the second tier portion supports the display panel by supporting the second substrate.

* * * * *